United States Patent [19]
Bonikowski

[11] 3,862,723
[45] Jan. 28, 1975

[54] WINDING APPARATUS FOR ELONGATED FLEXIBLE MATERIAL

[75] Inventor: Zbigniew Bonikowski, London, England

[73] Assignee: British Insulated Callender's Cables Limited, London, England

[22] Filed: July 12, 1973

[21] Appl. No.: 378,597

Related U.S. Application Data

[63] Continuation of Ser. No. 137,554, April 26, 1971, abandoned.

[52] U.S. Cl.................... 242/45, 242/75.51, 318/6
[51] Int. Cl............................................ B65h 59/38
[58] Field of Search................. 242/45, 75.51, 75.5; 318/6

[56] References Cited
UNITED STATES PATENTS

| | | | |
|---|---|---|---|
| 2,157,739 | 5/1939 | McBain......................... | 242/75.51 X |
| 2,325,381 | 7/1943 | Edwards et al. ................ | 242/75.51 |
| 2,569,287 | 9/1951 | Burgwin et al................ | 242/75.51 X |
| 2,583,074 | 1/1952 | Allbert et al..................... | 242/75.51 |
| 2,765,989 | 10/1956 | Pell.................................. | 242/75.51 |
| 2,990,484 | 7/1961 | Jones............................ | 242/75.51 X |
| 3,114,850 | 12/1963 | Hansen......................... | 242/75.51 X |
| 3,223,906 | 12/1965 | Dinger.......................... | 242/75.51 X |
| 3,471,099 | 10/1969 | Albert............................. | 242/75.51 |
| 3,587,798 | 6/1971 | Schuman ......................... | 242/45 X |
| 3,670,975 | 6/1972 | Tomimatsu................... | 242/75.51 X |

*Primary Examiner*—Stanley N. Gilreath
*Attorney, Agent, or Firm*—Webb, Burden, Robinson & Webb

[57] ABSTRACT

An electrical device for generating a voltage proportional to the linear velocity of wire being wound on to or from a coil wound on a drum comprises means for deriving a voltage signal representing the angular velocity of the drum, a detector capable of directly measuring the radius of the coil, and coupling means through which the voltage-deriving means is coupled to and can be actuated by the radius detector in such a way that a voltage signal representing the linear velocity of the wire can be produced. Preferably the device includes a tacho-generator, driven by the drum, having its output connected across a potentiometer, the adjusting arm of which is actuated by the radius detector.

3 Claims, 3 Drawing Figures

WINDING APPARATUS FOR ELONGATED FLEXIBLE MATERIAL

This is a continuation of application Ser. No. 137,554, filed Apr. 26, 1971, now abandoned.

In apparatus for winding elongate flexible material (hereinafter referred to as wire) on to or from a coil wound on a rotating cylindrical take-up or supply member (hereinafter referred to as a drum) it is often convenient to compute the linear velocity of the wire from the drum speed and the object of the present invention is to provide an electrical device capable of generating a voltage proportional to the linear velocity of the wire.

One application of the device in accordance with the present invention is described and claimed in U.S. Pat. No. 3,694,711 entitled "Apparatus for Detecting Faults in Elongated Flexible Material" which issued on an application filed by Zbigniew Bonikowski and Bruce Henry Keen concurrent with application Ser. No. 137,554.

The device in accordance with the invention for generating a voltage proportional to the linear velocity of wire being wound on to or from a coil wound on a drum comprises a means for deriving a voltage signal representing the angular velocity of the drum, a detector capable of directly measuring the radius of the coil, and coupling means through which the voltage-deriving means is coupled to and can be actuated by the radius detector in such a way that a voltage signal representing the linear velocity of the wire can be produced.

The preferred device in accordance with the invention comprises a tacho-generator, driven by the drum, having its output connected across a potentiometer, the adjusting arm of which is actuated by a detector capable of measuring the radius of the coil wire. By continually measuring the radius of the coil, the voltage signal representing the angular velocity of the drum may be automatically adjusted in accordance with the measurement in such a way as to produce a voltage signal representing the linear velocity of the wire.

When the radius detector is a mechanical feeler mechanically coupled to the adjusting arm of the potentiometer, we prefer to introduce some damping, to damp out minor fluctuations of the potentiometer.

The device in accordance with the invention has as its principal application the derivation of a voltage which cana be utilised to maintain the linear velocity of wire being wound on or from a drum substantially constant, for example by controlling driving and/or braking means for the drum, and the invention includes a method of maintaining substantially constant the linear velocity of wire being wound on to or from a coil or a drum by means of the electrical device of the present invention.

The invention will be further illustrated by a description, by way of example, of a preferred device for generating a voltage proportional to the linear velocity of wire being wound on to a coil, with reference to the accompanying drawing, in which.

Figure 1:
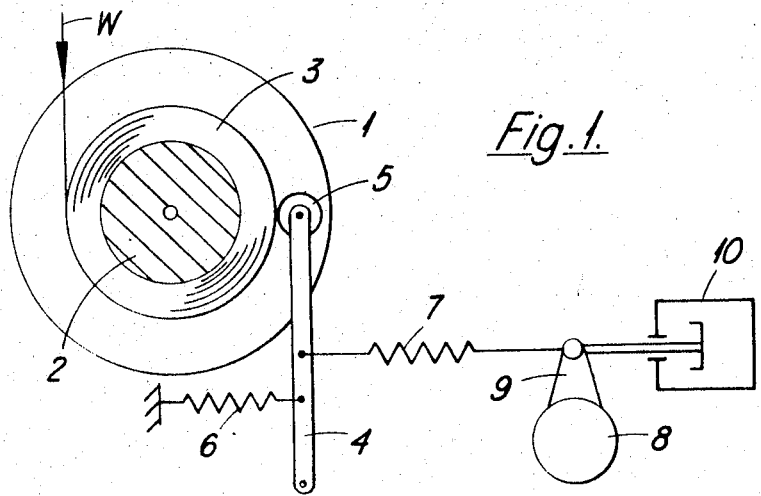
FIG. 1 is a diagrammatic representation of the device.

Wire W is wound on to a coil 3 building up on the barrel 2 of a drum 1 and the radius of the coil is measured by a feeler roller 5 mounted on the end of a pivoted feeler arm 4 biassed towards the coil by a spring 6. The feeler arm 4 is coupled by a coil spring 7 to the adjusting arm 9 of a rotary potentiometer 8, which is also coupled to an hydraulic dash-pot 10.

Figure 2:
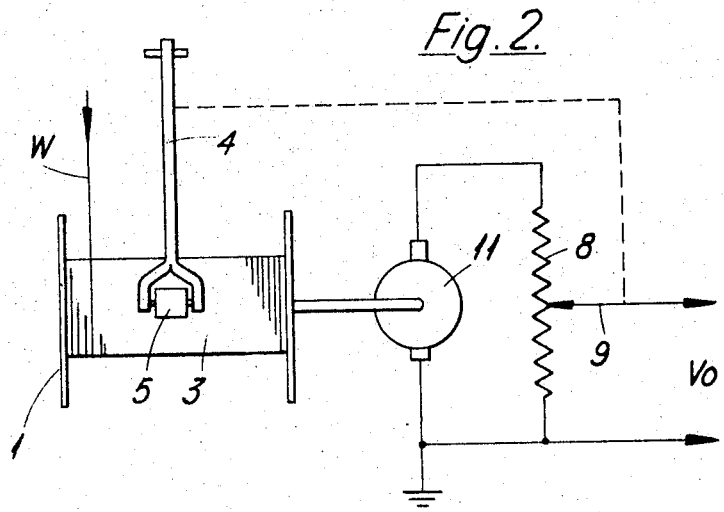
FIG. 2 is a simplified circuit diagram of the device.

As will be seen on referring to the circuit diagram shown in FIG. 2, a tacho-generator 11 is driven by the drum 1 and its output which represents the angular velocity of the drum is fed across the potentiometer 8, the position of the adjusting arm 9 representing the radius of the drum. The arrangement is such that the output Vo from the potentiometer is proportional to the linear velocity of the wire W.

Figure 3:
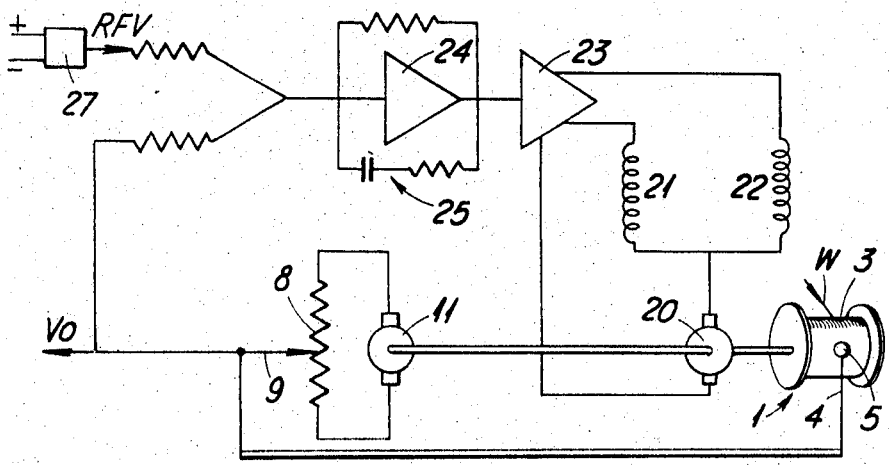
FIG. 3 is a schematic illustration of a system employing the device in maintaining substantially constant the linear velocity of wire being wound on to a coil on a drum.

A system for controlling a motor driving a take-up drum on which a coil of wire is being wound in such a way that the linear velocity of the wire is maintained substantially constant is shown in FIG. 3. In the system a take-up drum 1 on which wire W is being wound is driven by a split series D.C. servo motor 20 through a gear train (not shown), the opposing field windings 21 and 22 of which are supplied by a D.C. amplifier 23 (e.g. of the kind described and claimed in U.S. Pat. No. 3,233,397 which has two output circuits, connected to each field winding 21 and 22, which are selectively energised in dependence on whether the D.C. input of the amplifier is above or below a preset value.

The motor 20 also drives a tacho-generator 11 the output of which is connected across a potentiometer 8. The adjusting arm 9 of the potentiometer is controlled by a pivoted feeler arm 4 coupled to the arm 9 and carrying a feeler roller 5 which bears on and detects changes in the radius of the coil 3 of wire being built up on the drum barrel.

A feedback signal constituted by the output voltage Vo from the potentiometer 8 provides, with the output RFV of a ramp function generator 27 constituting a reference signal representing the desired linear velocity of the wire, the D.C. input to the amplifier 23. This input is through an operational type amplifier 24 which effectively isolates the feedback signal Vo from the reference signal RFV and enables the closed loop system to be stabilised by suitably placed capacitance resistance networks, as shown for example at 25. Errors between the reference signal RFV and the feedback signal Vo are amplified by the amplifiers 23 and 24 and, depending upon whether an error is above or below a preset value, each error signal is fed to one of the field windings 21 and 22 to cause either a braking or driving torque to be applied via the motor 20 to the drum 1 in such a way that the resulting change in linear velocity of the wire W reduces the magnitude of the error.

To explain operation of the system mathematically, for the linear velocity v of the wire to be maintained substantially constant the product of the angular velocity $w$ of the drum and the radius $R$ of the coil must be kept constant since $$v = w.r$$

If $v$ is to be directly proportional to the system reference voltage, that is the output RFV from the ramp function generator 27, it follows that the feedback signal Vo must be directly proportional to the product of $w$ and $R$.

Now, the output voltage Vt of the tacho-generator 11 is given by $$V_t = K_t.w$$

where $K_t$ is a constant,
and the feedback signal $V_o$ from the potentiometer 8 is given by $$V_o = V_n.k_r.R$$

where $V_n$ is the voltage applied to the potentiometer and $k_r$ is a constant of the radius measuring system. Since $$V_n = V_t \text{ it follows that}$$

$$V_o = K_t.K_r.w.R$$

and that therefore the feedback signal $V_o$ is directly proportional to the product of $w$ and $R$. Consequently, if the reference signal RFV is constant the linear velocity of the wire being wound on the drum 1 will be maintained substantially constant.

What I claim as my invention is:

1. An electrical device for generating a voltage proportional to the linear velocity of wire being wound on to or from a coil wound on a drum comprising a tacho-generator driven by the drum; a potentiometer having an adjusting arm, the output of the tacho-generator being connected across the potentiometer; a detector capable of directly measuring the radius of the coil of wire; and coupling means through which the adjusting arm of the potentiometer is coupled to and can be actuated by the radius detector to produce a voltage signal representing the linear speed of the wire.

2. An electrical device as claimed in claim 1, wherein the radius detector comprises a mechanical feeler and coupling means by which the feeler is mechanically coupled to the adjusting arm of the potentiometer and wherein damping means is provided to damp out minor fluctuations of the potentiometer.

3. An electrical device as claimed in claim 2, wherein the potentiometer is a rotary potentiometer, the mechanical feeler comprises a pivoted feeler arm, spring means by which the arm is spring-biased towards the coil and a feeler roller mounted on one end of the arm, and wherein said damping means comprises a spring coupling the feeler arm to the adjusting arm of the rotary potentiometer and a hydraulic dash-pot coupled to the adjusting arm of the rotary potentiometer.

* * * * *